No. 879,199.

PATENTED FEB. 18, 1908.

B. F. SCHIRMER.
PNEUMATIC TIRE.
APPLICATION FILED APR. 15, 1907.

Witnesses
Lucille O'Neill
C. H. Olds

Inventor
Baldwin F. Schirmer
By Wm. M. Monroe
Attorney

UNITED STATES PATENT OFFICE.

BALDWIN F. SCHIRMER, OF INDIANAPOLIS, INDIANA.

PNEUMATIC TIRE.

No. 879,199.   Specification of Letters Patent.   Patented Feb. 18, 1908.

Application filed April 15, 1907. Serial No. 368,221.

*To all whom it may concern:*

Be it known that I, BALDWIN F. SCHIRMER, a citizen of the United States, and resident of Indianapolis, county of Marion, State of Indiana, have invented certain new and useful Improvements in Pneumatic Tires, of which I hereby declare the following to be a full, clear, and exact description, such as will enable others skilled in the art to which it appertains to make and use the same.

The invention relates to improvements in pneumatic tires and the invention is designed to employ a series of inflated buffer springs or compressed air cylinders having pistons therein and arranged about the rim of the wheel, and having a common annular air chamber for the cylinders as described in a previous application Serial No. 286,025.

The particular objects of this invention are to provide circulating passages and a valve system whereby the air from outside the tire can be continually pumped into this annular chamber to take the place of air which has leaked out of the tire and in this manner maintain a permanent resistance in the buffers. To accomplish this object, I employ the arrangement of circulating passages and inlet and outlet valves, as hereinafter described and specifically pointed out in the claims.

Figure 1:
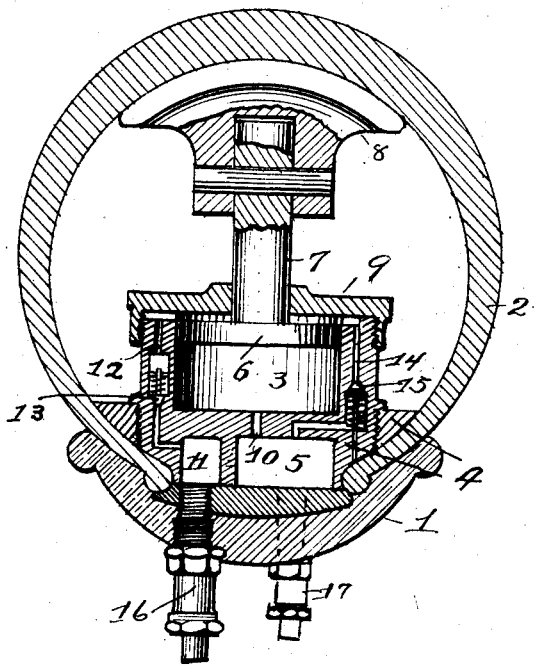
Figure 2:
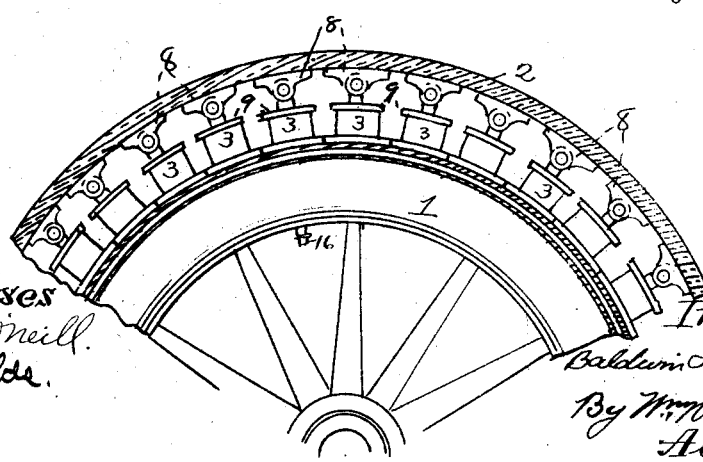

In the accompanying drawings, Figure 1 is a transverse section of tire upon the central line of one of the cylinders; Fig. 2 is a longitudinal section through the center of the tire and rim.

In these views 1 is the rim, 2 the tire casing, 3 a series of cylinders having a common metallic ring 4 in which they are secured and in which the chamber 5 common to all of the cylinders is formed. A piston 6 within each cylinder is provided with a projecting stem 7 and with a broad shoe 8 which with the other pistons distend the tire and yield in succession to pressure when weight is brought to bear upon them. A cylinder head (9) closes the outer end of each cylinder, and has the usual opening for the piston rod or stem 7 to pass through.

Each cylinder communicates with the common chamber 5, by means of an opening 10 so that the pressure in that chamber is communicated with equal power to each piston. At one side of this common chamber 5, is shown a similar annular chamber 11, communicating with the outer end of each cylinder above each piston by means of the lateral passage 12 in each cylinder, which is controlled by means of a valve 13, and a similar passage 14 in the wall of each cylinder connects the upper end of each cylinder with the common chamber 5 and is controlled by means of a valve 15. And inlet valve 16 admits air to the annular chamber 11 and the action of the several pistons when depressed into their respective cylinders causes an automatic flow of air into the cylinder above each piston through the passages 12, and when the pistons rise again in their respective cylinders the air will be drawn into the common chamber 5 through the passages 14. This repeated action will maintain the pressure in the common chamber unreduced in strength so that the inevitable continuous leakage of a pneumatic tire will be offset by the slight continuous renewal of air thereto.

A separate inlet valve 17 may be employed by means of which the initial pressure can be supplied to the common chamber and thus maintain the outward pressure upon the pistons sufficient to force the air out of the upper ends of the cylinder as the pistons rise.

I do not claim the exact arrangement or proportions of the various passages and valves, but

What I claim as new and desire to secure by Letters Patent is:—

1. The combination, with a rim and tire casing, of a ring upon said rim, a series of cylinders set therein at frequent intervals, a common chamber inclosed in said ring for all said cylinders and communicating with the inner ends of said cylinders, a piston in each cylinder, a stem and broadened shoe therefor, a casing against which said shoes are adapted to exert pressure, an annular chamber in said ring, communicating with the outer ends of said cylinders, and having an inlet valve, passages leading from the outer ends of said cylinders to the said aforesaid common chambers and valves in said passages.

2. The combination in a pneumatic tire, of a casing and rim therefor, a ring encircling the said rim, cylinders mounted at intervals in said ring, pistons and piston stems in said cylinders, broadened shoes for said stems, adapted to engage said casing, a common annular compressed air chamber in said ring, communicating with each of said cylinders at their lower ends, an air inlet chamber communicating with each of said cylinders at their outer ends, an inlet valve for said inlet chamber and passages connecting the outer ends of said cylinders with the common compressed air passage, and valves in said passages.

In testimony whereof I hereunto set my hand this 10th. day of April, 1907.

BALDWIN F. SCHIRMER.

In presence of—
C. H. OLDS,
WM. M. MONROE.